US012741696B2

(12) United States Patent
Reus

(10) Patent No.: US 12,741,696 B2
(45) Date of Patent: Sep. 22, 2026

(54) SPLASHGUARD DEVICE FOR A WHEELED VEHICLE

(71) Applicant: R-PI, Saint Martin de Fraigneau (FR)

(72) Inventor: Monsieur Pierre Reus, Nantes (FR)

(73) Assignee: R-PI, Saint Martin de Fraigneau (FR)

( * ) Notice: Subject to any disclaimer, the term of this patent is extended or adjusted under 35 U.S.C. 154(b) by 274 days.

(21) Appl. No.: 18/575,840

(22) PCT Filed: Jun. 21, 2022

(86) PCT No.: PCT/FR2022/051198
§ 371 (c)(1),
(2) Date: Dec. 30, 2023

(87) PCT Pub. No.: WO2023/275455
PCT Pub. Date: Jan. 5, 2023

(65) Prior Publication Data
US 2024/0351640 A1 Oct. 24, 2024

(30) Foreign Application Priority Data
Jul. 1, 2021 (FR) ....................................... 2107165

(51) Int. Cl.
*B62D 25/18* (2006.01)

(52) U.S. Cl.
CPC .................................. *B62D 25/182* (2013.01)

(58) Field of Classification Search
CPC ............................ B62D 25/182; B62D 25/163
See application file for complete search history.

(56) References Cited

U.S. PATENT DOCUMENTS 5,582,431 A 12/1996 Anderson
9,969,436 B1 * 5/2018 Gause .................. B60R 16/023
(Continued)

FOREIGN PATENT DOCUMENTS

EP 0125072 11/1984

OTHER PUBLICATIONS

International Search Report dated Aug. 22, 2022.
Search Report dated Feb. 26, 2022.

*Primary Examiner* — Brian L Swenson
(74) *Attorney, Agent, or Firm* — IPSILON USA, LLP

(57) ABSTRACT

A splashguard device (1) for a wheeled vehicle has at least one wheel (30) resting on the ground. The device (1) has a splashguard (2) to the rear of the wheel (30) and a supporting structure (3) supporting the guard (2). The guard (2) has an upper edge (4), a lower edge (5) and two lateral edges (6). This guard (2) has a face (7) able to face towards the wheel that is to be protected and an opposite face (8). The guard (2) is mounted with the ability to move relative to the supporting structure (3) so that when the device (1) is coupled to the vehicle, the guard (2) can be moved between a raised position away from the ground and a lowered position. The guard (2) has at least a deformable flexible water-permeable part (9) formed of a collection of discrete elongate flexible elements (10) arranged side-by-side in the manner of a brush, each discrete element having a free end (11), at least some of the discrete elements (10) forming, via a free end (11), the lower edge (5) of the guard (2) and extending towards the upper edge (4) of the guard (2). The splashguard device (1) has a shaper (12) at least partially surrounding the guard (2) and configured to deform the guard (2) in the direction that moves the lateral edges (6) and/or the faces (7, 8) of the guard (2) closer together as the guard (2) moves from the lowered position to the raised position.

13 Claims, 5 Drawing Sheets

(56) References Cited

U.S. PATENT DOCUMENTS

| | | | | |
|---|---|---|---|---|
| 10,683,041 | B1 * | 6/2020 | Smith | B60P 1/283 |
| 2003/0098577 | A1 * | 5/2003 | Keller | B62D 25/182<br>280/851 |
| 2004/0164539 | A1 * | 8/2004 | Bernard | B62D 25/182<br>280/848 |
| 2009/0273176 | A1 * | 11/2009 | Ulgen | B62D 25/182<br>280/851 |
| 2017/0137070 | A1 * | 5/2017 | Proctor | B62D 25/182 |
| 2018/0273113 | A1 | 9/2018 | Reus | |
| 2019/0118874 | A1 * | 4/2019 | Ibañez Moreira | F16D 65/807 |
| 2024/0077447 | A1 * | 3/2024 | Niemann | B62D 25/163 |

* cited by examiner

SPLASHGUARD DEVICE FOR A WHEELED VEHICLE

RELATED APPLICATION

This application is a National Phase of PCT/FR2022/0511198 filed on Jun. 21, 2022, which claims the benefit of priority from French Patent Application No. 21 07165 filed on Jul. 1, 2021, the entirety of which are incorporated by reference.

FIELD OF THE INVENTION

The present invention concerns a splashguard device for a wheeled vehicle comprising at least one wheel resting on the ground and an assembly comprising such a device.

DESCRIPTION OF THE RELATED ART

It concerns in particular a splashguard device for a wheeled vehicle comprising at least one wheel resting on the ground, the device comprising a splashguard adapted to be disposed at least partly to the rear of the wheel and a supporting structure supporting the guard, the splashguard having an upper edge, a lower edge and two lateral edges, this splashguard having a face adapted to face toward the wheel that is to be protected and an opposite face termed the back of the guard, the guard being mounted with the ability to move relative to the supporting structure so that when the device is coupled to the vehicle the guard can be moved between two positions, one a so-called raised position away from the ground, the other a so-called lowered position close to the ground, the guard comprising at least one deformable flexible water-permeable part formed of a collection of discrete elongate flexible elements, such as bristles, disposed side-by-side in the manner of a brush, each discrete element having a free end, at least some of the discrete elements forming, via their free end, the lower edge of the guard and extending in the direction of the upper edge of the guard.

Splashing at the rear of the vehicle caused by a vehicle rolling on a wet road has for many years caused accidents. The presence of mudflaps or mudguards around at least part of at least the rear wheel or wheels of said vehicle enables reduction of splashing. However, these mudflaps or mudguards must, in particular in the case of trailer or semi-trailer trucks, be sufficiently far from the ground to prevent damage to these mudflaps or mudguards, in particular during loading or offloading at a dock. Because of this the lower free edge of the mudflap or mudguard is generally at a relatively great distance from the ground, leaving a large angle free for splashes. These same constraints apply to the vehicles, in particular during phases of parking the vehicles.

In attempts to solve this problem solutions have been imagined, as the patents FR 3 035 851 and U.S. Pat. No. 5,582,431 in particular illustrate. However, such solutions are not entirely satisfactory.

OBJECTS AND SUMMARY

An object of the invention is to propose a splashguard device of the aforementioned type the design of which enables the efficacy of the device to be increased.

To this end the invention has for object a splashguard device for a wheeled vehicle comprising at least one wheel resting on the ground, the device comprising a splashguard adapted to be disposed at least partly to the rear of the wheel and a supporting structure supporting the guard, the splashguard having an upper edge, a lower edge and two lateral edges, this splashguard having a face adapted to face toward the wheel that is to be protected and an opposite face termed the back of the guard, the guard being mounted with the ability to move relative to the supporting structure so that when the device is coupled to the vehicle, the guard can be moved between two positions, one a so-called raised position away from the ground, the other a so-called lowered position close to the ground, the guard comprising at least one deformable flexible water-permeable part formed of a collection of discrete elongate flexible elements, such as bristles, disposed side-by-side in the manner of a brush, each discrete element having a free end, at least some of the discrete elements forming, via their free end, the lower edge of the guard and extending in the direction of the upper edge of the guard, characterized in that the splashguard device comprises a shaper at least partially surrounding said guard, said shaper being configured to deform the guard in the direction that moves the lateral edges and/or the faces of the guard closer together as said guard moves from the lowered position to the raised position. Thanks to the presence of the shaper, the guard can be widely deployed in the lowered position without compromising its reduced bulk in the raised position. The wide deployment of the guard in the lowered position enables the guard to extend beyond the outline of the wheel. This wide deployment of the guard in the lowered position also makes it possible to increase the thickness of the guard between its front face and its back, which again has the effect of increasing the efficacy of the guard.

In accordance with one embodiment of the invention the guard is mounted to be mobile in sliding relative to the supporting structure. This results in a simple splashguard device and a small overall size of the device.

In accordance with one embodiment of the invention the supporting structure comprises at least one plate type apron and in that the guard is mounted to be mobile up and down the apron in the vertically positioned state of the apron for the movement of said guard from a raised position in which the guard and the apron overlap at least partially and a lowered position in which the guard projects from a so-called lower transverse edge of the apron to increase the area of the apron. The presence of an apron of this kind, which may be curved, enables best prevention of some splashing.

In accordance with one embodiment of the invention the apron is flanked by two flanges each integrating a path for guiding sliding movement of the guard. This design is characterized by its simplicity.

In accordance with one embodiment of the invention the guard is equipped with rolling members, such as rollers, each adapted to roll in a guide path of the flanges of the apron.

In accordance with one embodiment of the invention the shaper is carried by the supporting structure. This arrangement simplifies the device. The shaper is mounted on and fixed to the supporting structure.

In accordance with one embodiment of the invention the apron is flanked at the level of its lower transverse edge by a rim provided with through-openings through which the free ends of the discrete elements project, each through-opening forming an active part of the shaper. Producing the shaper in the form of a grill is a simple way to obtain a guard with one or more curtains with each curtain shaped by the shaper.

In accordance with one embodiment of the invention each through-opening is in the form of a longitudinal slot with the longitudinal axis of the slot extending substantially parallel to the apron.

In accordance with one embodiment of the invention the discrete elements of the guard are configured to form from one of the faces in the direction of the other face of the guard a curtain or a plurality of curtains separated from one another by a chamber in the lowered position of the guard. Producing the screen in the form of a succession of curtains enables creation of a plurality of consecutive volumes in which the kinetic energy of the splashes is absorbed and the splashes are directed toward the ground in order that the original spraying is totally eliminated.

In accordance with one embodiment of the invention the guard comprises, for the or each curtain, a rigid part coupling the discrete elements to one another at the level of the end of the discrete elements opposite their free end and a base to which the rigid part is coupled to pivot about an axis coplanar with the guard and transverse to the direction of raising and lowering the guard. This articulated mounting makes it possible to assist the deployment of the guard during the movement from the raised position to the lowered position and its stowage during the movement of the guard from the lowered position to the raised position.

In accordance with one embodiment of the invention the device comprises, for the movement of the guard between a lowered position and a raised position, a system for driving sliding movement of the guard.

In accordance with one embodiment of the invention the system for driving sliding movement of the guard comprises a gear drive mechanism meshing with the bolt of a bolt/nut assembly and an actuator for driving movement of the bolt or of the nut. The actuator is preferably coupled to the guard and is an actuator for driving axial movement of the nut mounted on and rotating on the bolt.

The invention further has for object an assembly of the type comprising a wheeled vehicle comprising at least one wheel resting on the ground and a splashguard device adapted to be associated with said wheel to protect against splashing resulting from the rotation of the wheel on the ground, said splashguard device comprising a splashguard adapted to be disposed at least partially to the rear of the wheel and a structure supporting the guard, the splashguard having an upper edge, a lower edge and two lateral edges, this splashguard having a face adapted to face toward the wheel to be protected and an opposite face referred to as the back of the guard, the guard being mounted to be mobile relative to the supporting structure to enable, in the state with the device coupled to the vehicle, movement of the guard between two positions, one, termed raised, away from the ground, the other, termed lowered, close to the ground, the guard comprising at least one deformable flexible part permeable to water formed of a collection of discrete elongate flexible elements, such as bristles, disposed side-by-side in the manner of a brush, each discrete element having a free end, at least some of the discrete elements forming via their free end the lower edge of the guard and extending in the direction of the upper edge of the guard, characterized in that the splashguard device is of the aforementioned type.

BRIEF DESCRIPTION OF THE DRAWINGS

The invention will be clearly understood after reading the following description of embodiments with reference to the appended drawings in which.

Figure 1:
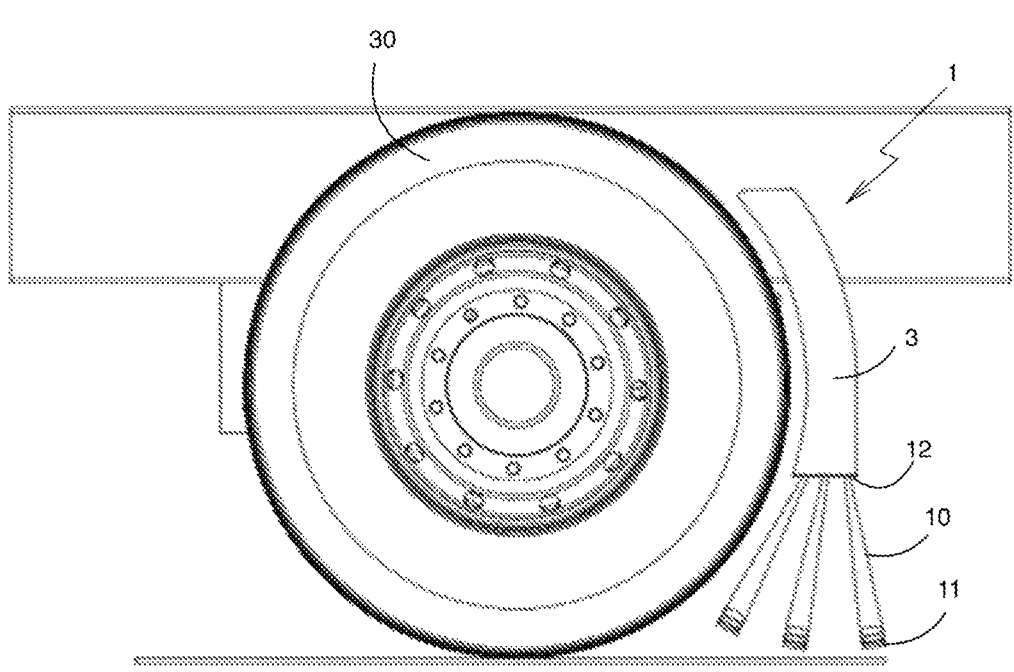
FIG. 1 represents two schematic side views of the same splashguard device associated with a wheel, one view corresponding to the device in the lowered position of the guard, the other in the raised position of the guard.
Figure 1:
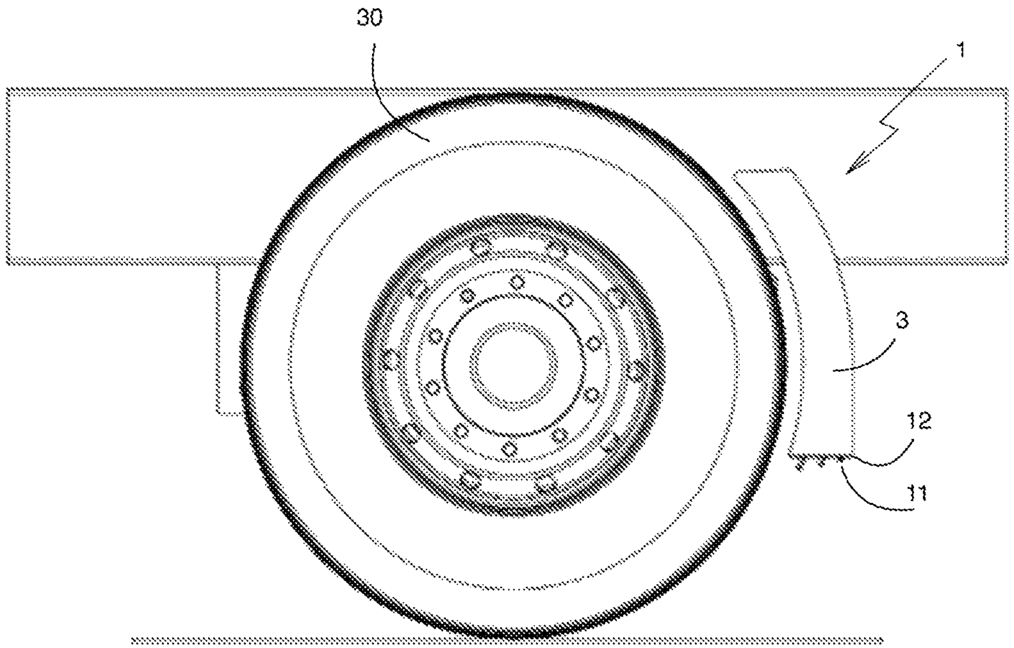

As mentioned hereinabove the splashguard device 1 that is the object the invention is more particularly intended to equip a wheeled vehicle comprising at least one wheel 30 resting on the ground. This wheeled vehicle can therefore be, for example, a motorcycle, a car, a truck such as a semi-trailer or any other 30 wheeled vehicle. Only a part of the chassis of the vehicle has been represented in the drawings.

The splashguard device 1 may be associated with the wheel 30 of the vehicle resting on the ground disposed farthest to the rear of the vehicle to prevent splashing at the rear of the vehicle resulting from rotation of the wheel. Without departing from the scope of the invention this device 1 may similarly be associated with a front wheel or an intermediate wheel.

This device comprises a splashguard 2 adapted to be disposed at least partially to the rear of the wheel 30. This splashguard 2 has an upper edge 4, a lower edge 5 and two lateral edges 6.

This splashguard 2 has a face 7 adapted to face toward the wheel to be protected and an opposite face 8 termed the back of the guard 2.

This splashguard device 1 further comprises a structure 3 supporting the guard 2 that may take a great number of forms. The supporting structure 3 may be fixed either to the chassis or to the axle of the wheels of the vehicle in the configuration of use of the device. This supporting structure 3 may further be produced at least partially in one piece, for example with a part of the mudguard of the wheel 30 of the vehicle resting on the ground.

The guard 2 is mounted on a supporting structure 3 to be mobile relative to the supporting structure 3 to enable movement of the guard 2 relative to the supporting structure 3. Thus, when the supporting structure 3 is positioned away from the ground the guard 2 is mounted to be mobile on the supporting structure 3 to enable movement of the guard 2 between two positions, one a so-called raised position away from the ground, the other a so-called lowered position close to the ground. This is the case with the device 1 coupled to the vehicle.

In the examples represented the guard 2 is mounted to be mobile in sliding relative to the supporting structure 3. In particular, the supporting structure 3 comprises at least one plate type apron 13 and the guard 2 is mounted to be mobile up and down the apron 13 in the vertically positioned state of the apron 13 for the passage of said guard 2 from a raised position in which the guard 2 and the apron 13 overlap at least partially to a lowered position in which the guard 2 projects from the lower transverse edge 14 of the apron 3 to increase the area of the apron 13.

The apron 13, the plate of which is a curved plate that follows the radius of curvature of the wheel, is therefore arranged between the guard 2 and the wheel 30 in the raised position of the guard 2, as depicted in the figures.

The face 7 of the guard 2 opposite its back faces the apron 13. In the examples represented the apron 13 is flanked by two flanges 15 each integrating a path 16 for guiding sliding movement of the guard 2. The flanges 15 are parallel to each other. They project from the face of the apron plate opposite that facing toward the wheel. This guide path 16 incorporated in each flange 15 takes the form of an oblong slot forming a rail for a rolling member 17 with which the guard 2 is equipped.

In fact, the guard 2 is equipped with rolling members 17 such as rollers each adapted to roll on a guide path 16 of the flanges 15.

Figure 2:
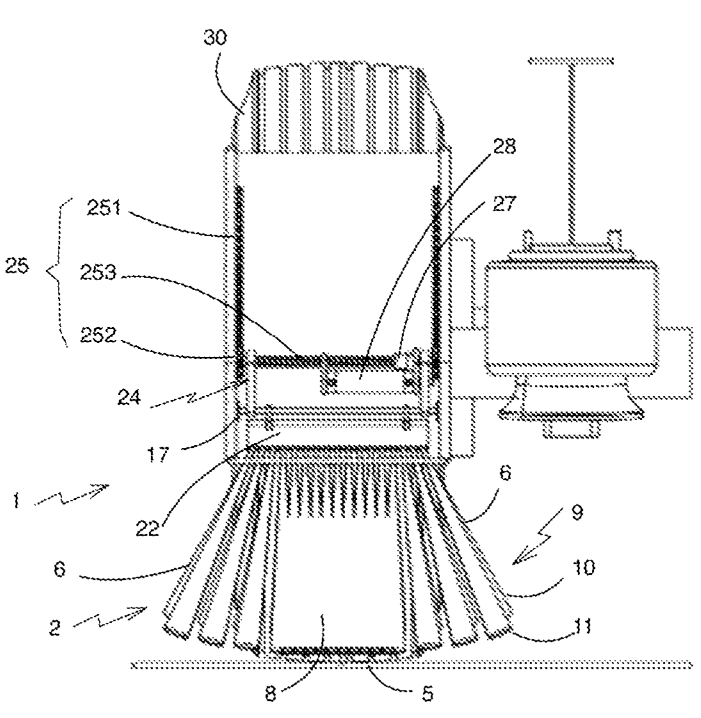
FIG. 2 represents two schematic front views of the same splashguard device associated with a wheel, one view corresponding to the device in the lowered position of the guard, the other in the raised position of the guard.
Figure 2:
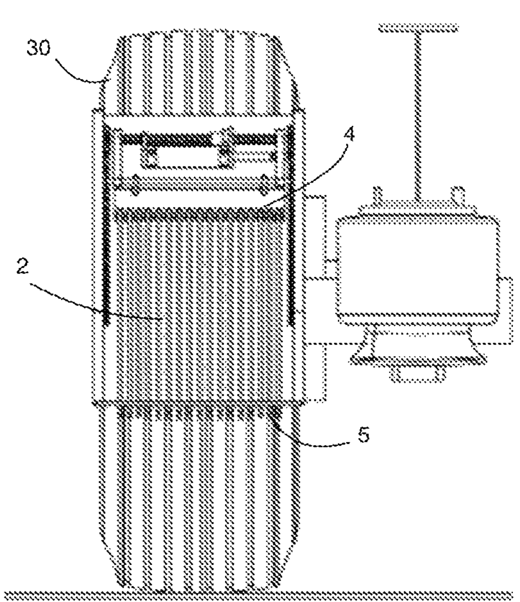

As depicted in FIG. 2 for example, the guard 2 comprises at least one deformable flexible water-permeable part 9 formed by a collection of discrete elongate elements 10 such as bristles arranged side-by-side in a manner of a brush. Each discrete element 10 has a free end 11. The free ends 11 of at least some of the discrete elements 10 form the lower edge 5 of the guard 2 and extend in the direction of the upper edge 4 of the guard 2.

At the level of their end opposite their free end 11 these discrete elements 10 may be connected to one another in groups or in the form of a single group with one or more rigid parts 22 of the guard to be described hereinafter.

In a manner that is characteristic of the invention the splashguard device 1 comprises a shaper 12 at least partially surrounding said guard 2 over at least a part of the height of the guard 2 between the upper edge and the lower edge of the guard 2. This shaper 12 is configured to deform the guard 2 in the direction that moves the lateral edges 6 and/or the faces 7, 8 of the guard 2 closer together as the guard 2 moves from the lowered position to the raised position.

The width of the guard between the lateral edges 6 of the guard is therefore adapted to decrease on movement of the guard 2 from the lowered position to the raised position and/or the thickness of the guard between the faces 7 and 8 of the guard is adapted to decrease on movement of the guard 2 from the lowered position to the raised position.

In practise the shaper 12 is carried by the supporting structure 3, and in particular the shaper 12 and the supporting structure 3 are made in one piece. In the examples represented the apron 13 is flanked at the level of its lower transverse edge 14 by a rim 18 provided with through-openings 19 through which the free ends 11 of the discrete elements 10 of the guard 2 project.

Each through-opening 19 forms a so-called active part of the shaper 12.

Here each through-opening 19 takes the form of a longitudinal slot with the longitudinal axis of the slot extending substantially parallel to the apron 13, in particular to the plate of the apron 13. Each slot therefore extends transversely to the flanges 15 of the apron 13 and transversely to the longitudinal axis of the vehicle. The shaper 12 may comprise a plurality of parallel slots, as in the example represented, or only one slot, depending on the required design of the guard 2. Thus here the shaper 12 takes the form of a grill in the form of an apertured surface provided with one or more parallel longitudinal slots. Obviously, the shaper 12 may take forms other than the form of a simple frame surrounding the guard. This frame constrains the discrete elements of the guard to move closer to one another at the level of their free end in the raised position of the guard. In the lowered position of the guard the free ends of the discrete elements are free of any constraint and tend to move away from one another and the overall size of the screen increases. In this lowered position of the guard the shaper extends at the level of the end of the discrete elements opposite the free end of the discrete elements. The guard 2 may form, from its front face 7 in the direction of its back, a curtain 20 if the shaper comprises only one slot or a plurality of curtains 20 separated from one another by a chamber 21 in the lowered position of the guard 2 if the shaper comprises a plurality of slots.

Each chamber 21 is formed by the space left free between two curtains 20 made up of discrete elements 10.

Each curtain is formed by the discrete elements 10 accommodated inside a slot.

In the raised position of the guard 2 each slot is positioned at the level of the lower edge of the guard 2, that is to say at the level of the free ends of the discrete elements 10.

The edges of the slot constrain the free ends of the discrete elements 10 to move as close as possible to one another to limit their overall size.

As the guard 2 is lowered the free ends of the discrete elements 10 and the parts of the discrete elements 10 adjoining the free ends are released from the action of the shaper gradually with the lowering of the guard 2, so that the free ends 11 of the discrete elements 10 are free of any constraint and can move away from one another to form a guard of larger size than its size in the raised stowage position between the flanges of the apron of the supporting structure.

To assist as much as possible the deployment of the discrete elements 10 during movement of the guard from the raised position to the lowered position the guard comprises, for the or each curtain 20, a rigid part 22 coupling the discrete elements 10 to one another at the level of the end of the discrete elements 10 opposite their free end 11 and a base 23 to which the rigid part 22 is coupled so as to pivot about an axis transverse to the direction of raising and lowering the guard 2.

Each series of discrete elements 10 that forms a curtain can therefore be freely oriented as the guard 2 moves between these various positions, to prevent jamming.

To enable a movement to raise or lower the guard 2 relative to the supporting structure 3 and the shaper 12 the splashguard device 1 comprises a system 24 for driving sliding movement of the guard 2 along the supporting structure. This system 24 for driving sliding movement of the guard 2 can take many forms.

In the example represented the system 24 for driving sliding movement of the guard 2 comprises a gear driving mechanism 25 engaged with the bolt 26 of a bolt 26/nut 27 assembly and an actuator 28 for driving movement of the bolt 26 or of the nut 27.

Figure 3:
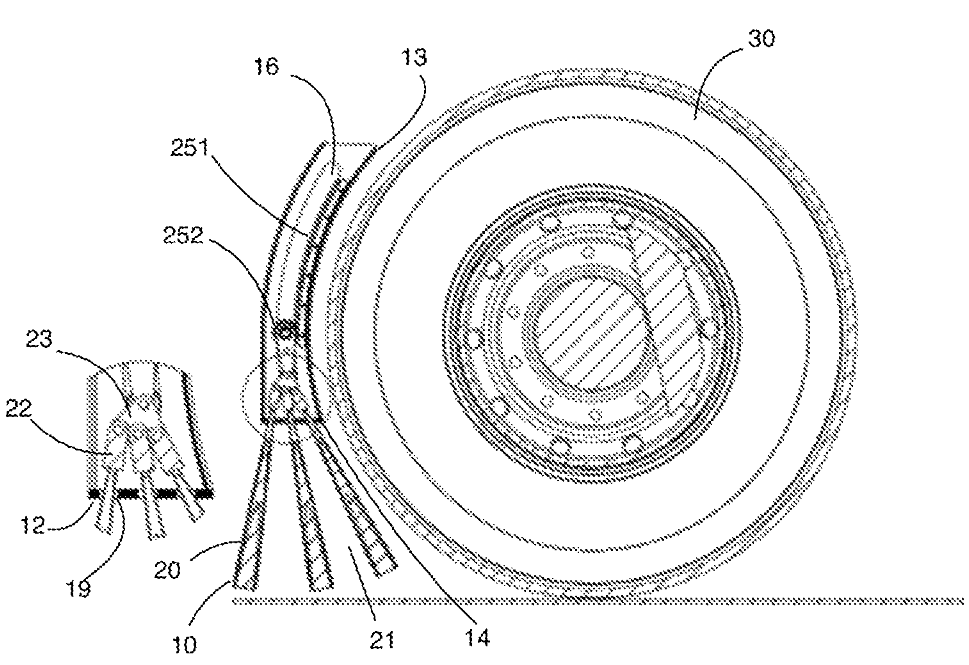
FIG. 3 represents two diagrammatic side views of the same splashguard device associated with a wheel, one view corresponding to the device in the lowered position of the guard, the other in the raised position of the guard, each schematic representation being associated with a detail view of the guard in the area of the shaper.
Figure 3:
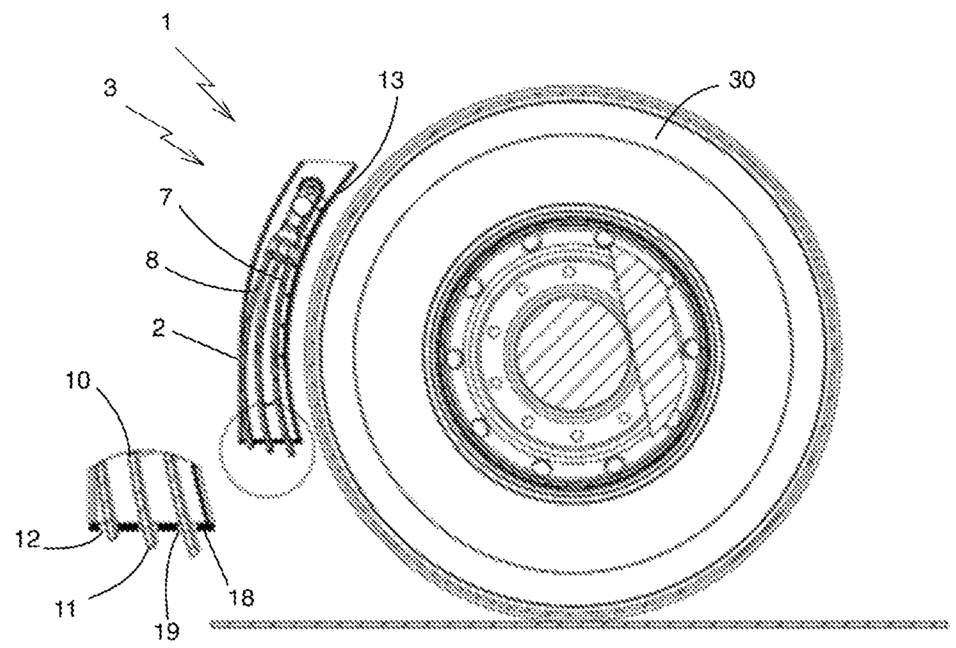
Figure 4:
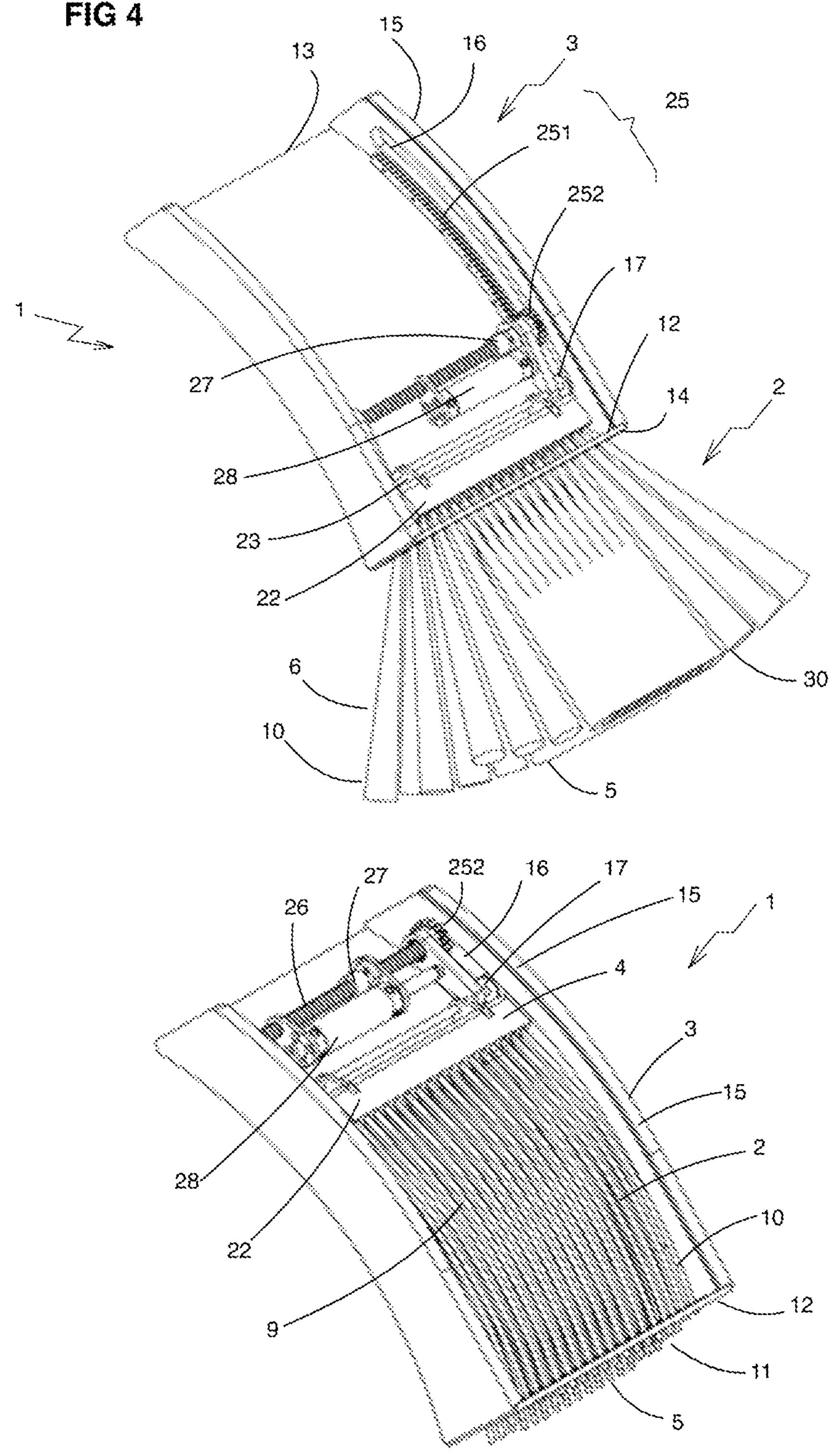
FIG. 4 represents two schematic perspective views of the same splashguard device associated with a wheel, one view corresponding to the device in the lowered position of the guard, the other in the raised position of the guard.
Figure 5:
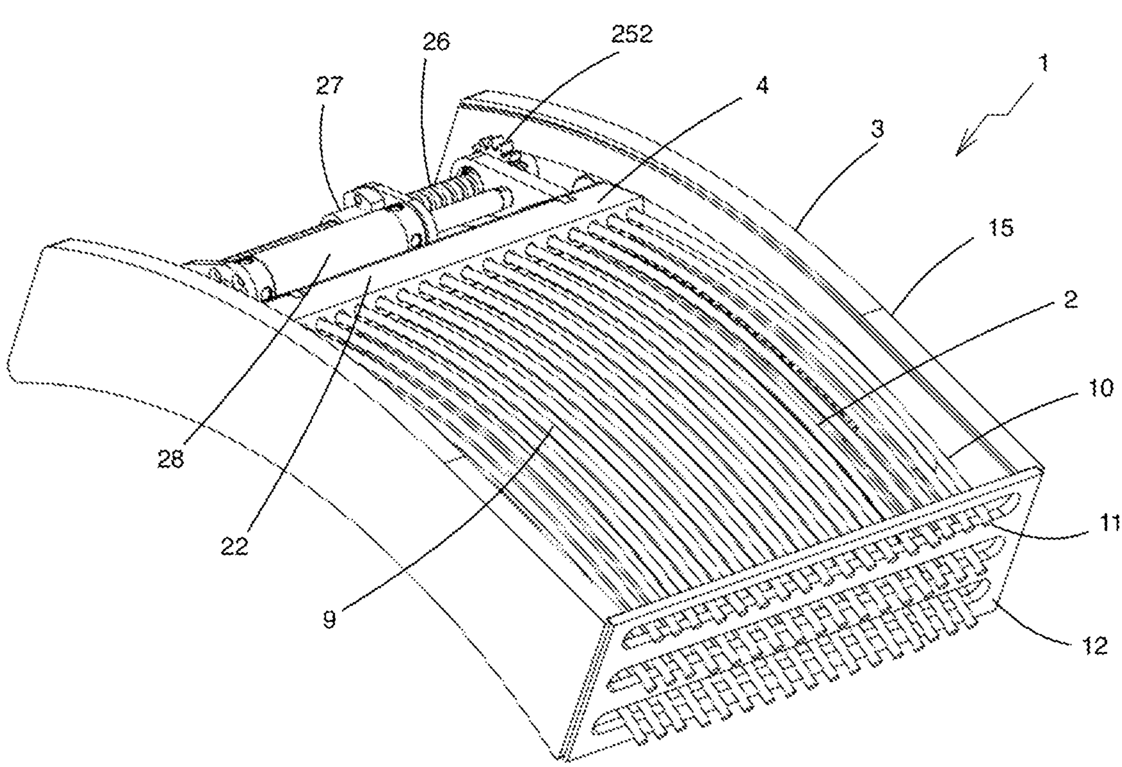
FIG. 5 represents a perspective view of a supporting structure and of the associated shaper to show better the through-openings of the shaper.

In particular, and as depicted in FIGS. 2 to 4, the gear driving mechanism 25 comprises two racks 251 extending parallel to one another along the apron 13, parallel to a flange 15 of the plate of the apron 13, on the side of the face of the plate opposite that facing toward the wheel.

The gear driving mechanism 25 further comprises two pinions 252 carried by the same rod 253. These pinions 252 are disposed one at one of the ends and the other at the other of the ends of the rod 253. Each pinion 252 engages with a rack 251.

The rod 253 forms a bolt 26. This bolt 26 constitutes the bolt of a bolt 26/nut 27 assembly. The nut 27 is screwed onto the bolt 26. This nut 27 is mounted fixed in rotation on the bolt 26 and is movable axially along the bolt 26 by an actuator 28. Here this actuator 28 is a cylinder with the nut 27 coupled to the mobile part of the cylinder formed here by the body of the cylinder. This bolt/nut assembly and the fixed part of the cylinder are coupled to the guard 2, in particular to the rigid part 22 of the guard 2. This rigid part 22 of the guard 2 already carries the rolling members 17 accommodated in the guard path 16 of the supporting structure 3.

Operation is as follows: movement in translation of the nut 27 along the bolt 26 generated by the actuator 28, by extension or retraction of the cylinder constituting the actuator 28, results in the bolt 26 being driven in rotation and consequently rotation of the pinions disposed at the end of the bolt 26. These pinions 252 progress along the racks 251. This progression is reflected in a raising or lowering movement of the guard 2 in the direction of axial movement of the guard 2.

In the examples represented the rotation of the nut is prevented by a reaction link. Note that the presence of two pinions 252 engaged with two racks 251 enables the guard 2 to progress in an identical manner at the level of each of its lateral edges 6.

Producing the actuator 28 in the form of a cylinder makes it possible to dispense with an end of travel sensor.

Actuation of the actuator 28, which may be a hydraulic or pneumatic actuator, may be controlled as a function of various parameters, namely and for example the detection of a wet road, the detection of rain, the detection of control input from the operator, the speed of rotation of the wheel or the speed of movement of the vehicle, etc.

To this end the device 1 may comprise a control unit of the actuator 28 configured to acquire data from a speed sensor and/or a rain sensor and/or a manual control member and/or some other type of sensor. Actuation of the actuator 28 in the direction to move the guard from the raised position to the lowered position enables the discrete elements 10 to be deployed as depicted in the right-hand view in FIG. 4 to occupy a position in which some discrete elements 10 are able to extend beyond the width of the wheel, as can be seen in FIG. 2, or to form successive curtains 20 separated by chambers 21, as depicted in the right-hand view in FIG. 3.

The efficacy of the device is therefore increased without risk of injuring third parties, in particular because of the flexible character of the discrete elements 10 which, in the example represented, are synthetic material, in particular polyamide, bristles.

Here the supporting structure 3 takes the form of a casing body open on its upper side and having no cap. Similarly, the supporting structure 3 could have taken the form of a closed casing or cassette, the body of the casing being closed by a cap to conceal the device for driving movement of the guard and to protect the guard 2 in the raised position of the guard 2.

Obviously, the invention equally concerns the assembly formed of a wheeled vehicle and at least one splashguard device 1 as described above.

The invention claimed is:

1. A splashguard device for a wheeled vehicle comprising:

at least one wheel resting on the ground, the device comprising a splashguard adapted to be disposed at least partly to the rear of the wheel and a supporting structure supporting the guard, the splashguard having an upper edge, a lower edge and two lateral edges, this splashguard having a face adapted to face toward the wheel that is to be protected and an opposite face termed the back of the guard, the guard being mounted with the ability to move relative to the supporting structure so that when the device is coupled to the vehicle the guard can be moved between two positions, one raised position away from the ground, the other lowered position close to the ground, the guard comprising at least one deformable flexible water-permeable part formed of a collection of discrete elongate flexible elements disposed side-by-side in the manner of a brush, each discrete element having a free end, at least some of the discrete elements forming, via their free end, the lower edge of the guard and extending in the direction of the upper edge of the guard, wherein the splashguard device comprises a shaper at least partially surrounding said guard, said shaper being configured to deform the guard in the direction that moves the lateral edges and/or the faces of the guard closer together as said guard moves from the lowered position to the raised position.

2. The wheeled vehicle splashguard device as claimed in claim 1, wherein the guard is mounted to be mobile in sliding relative to the supporting structure.

3. The wheeled vehicle splashguard device as claimed in claim 1, wherein the supporting structure comprises at least one plate type apron and in that the guard is mounted to be mobile up and down the apron in the vertically positioned state of the apron for the movement of said guard from a raised position in which the guard and the apron overlap at least partially and a lowered position in which the guard projects from lower transverse edge of the apron to increase the area of the apron.

4. The wheeled vehicle splashguard device as claimed in claim 3, wherein the apron is flanked by two flanges each integrating a path for guiding sliding movement of the guard.

5. The wheeled vehicle splashguard device as claimed in claim 4, wherein the guard is equipped with rolling members, each adapted to roll in a guide path of the flanges of the apron.

6. The wheeled vehicle splashguard device as claimed in claim 3, wherein the shaper is carried by the supporting structure, and wherein the apron is flanked at the level of its lower transverse edge by a rim provided with through-openings through which the free ends of the discrete elements project, each through-opening forming an active part of the shaper.

7. The wheeled vehicle splashguard device as claimed in claim 6, wherein each through-opening is in the form of a longitudinal slot with the longitudinal axis of the slot extending substantially parallel to the apron.

8. The wheeled vehicle splashguard device as claimed in claim 1, wherein the shaper is carried by the supporting structure.

9. The wheeled vehicle splashguard device as claimed in claim 1, wherein the discrete elements of the guard are configured to form from one face of the faces in the direction of the other face of the guard a curtain or a plurality of curtains separated from one another by a chamber in the lowered position of the guard.

10. The wheeled vehicle splashguard device as claimed in claim 9, wherein the guard comprises, for the or each curtain, a rigid part coupling the discrete elements to one another at the level of the end of the discrete elements opposite their free end and a base to which the rigid part is coupled to pivot about an axis coplanar with the guard and transverse to the direction of raising and lowering the guard.

11. The wheeled vehicle splashguard device as claimed in claim 1, wherein the device comprises, for the movement of the guard between a lowered position and a raised position, a system for driving sliding movement of the guard.

12. The wheeled vehicle splashguard device as claimed in claim 11, wherein the system for driving sliding movement of the guard comprises a gear drive mechanism meshing with the bolt of a bolt/nut assembly and an actuator for driving movement of the bolt or of the nut.

13. An assembly of the type comprising;

a wheeled vehicle comprising at least one wheel resting on the ground and a splashguard device adapted to be associated with said wheel to protect against splashing resulting from the rotation of the wheel on the ground, said splashguard device comprising a splashguard adapted to be disposed at least partially to the rear of the wheel and a structure supporting the guard, the splashguard having an upper edge, a lower edge and two lateral edges, this splashguard having a face adapted to face toward the wheel to be protected and an opposite face referred to as the back of the guard, the guard being mounted to be mobile relative to the supporting structure to enable, in the state with the device coupled to the vehicle, movement of the guard between two positions, one, termed raised, away from the ground, the other, termed lowered, close to the ground, the guard comprising at least one deformable flexible part permeable to water formed of a collection of discrete elongate flexible elements disposed side-by-side in the manner of a brush, each discrete element having a free end, at least some of the discrete elements forming via their free end the lower edge of the guard and extending in the direction of the upper edge of the guard, wherein the splashguard device conforms to claim 1.

* * * * *